United States Patent
Huang et al.

(10) Patent No.: US 11,870,289 B2
(45) Date of Patent: Jan. 9, 2024

(54) METHOD FOR CHARGING TRACTION BATTERY AND BATTERY MANAGEMENT SYSTEM

(71) Applicant: CONTEMPORARY AMPEREX TECHNOLOGY CO., LIMITED, Ningde (CN)

(72) Inventors: Shan Huang, Ningde (CN); Shichao Li, Ningde (CN); Haili Li, Ningde (CN); Wei Zhao, Ningde (CN); Zhen Lin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/327,702

(22) Filed: Jun. 1, 2023

(65) Prior Publication Data
US 2023/0307934 A1    Sep. 28, 2023

Related U.S. Application Data

(63) Continuation of application No. PCT/CN2021/117314, filed on Sep. 8, 2021.

(51) Int. Cl.
*H02J 7/00* (2006.01)
*H01M 10/44* (2006.01)
(Continued)

(52) U.S. Cl.
CPC ............ *H02J 7/0048* (2020.01); *B60L 58/13* (2019.02); *H01M 10/425* (2013.01); *H01M 10/44* (2013.01); *H01M 2010/4271* (2013.01); *H01M 2220/20* (2013.01)

(58) Field of Classification Search
CPC ..... H02J 7/0048; B60L 58/13; H01M 10/425; H01M 10/44; H01M 2010/4271; H01M 2220/20
USPC ......................................................... 320/132
See application file for complete search history.

(56) References Cited

U.S. PATENT DOCUMENTS 9,077,187 B2    7/2015  Tang
11,360,148 B2 * 6/2022  Zhang .................. G01R 31/367
(Continued)

FOREIGN PATENT DOCUMENTS

CN    101082892 A    12/2007
CN    103023082 A    4/2013
(Continued)

OTHER PUBLICATIONS

The World Intellectual Property Organization (WIPO) International Search Report and Written Opinion for PCT/CN2021/117314 dated Apr. 1, 2022 11 pages (including English translation).
(Continued)

*Primary Examiner* — Nathaniel R Pelton
(74) *Attorney, Agent, or Firm* — ANOVA LAW GROUP, PLLC

(57) ABSTRACT

A method for charging a traction battery includes obtaining a battery parameter of the traction battery that includes a state of charge and/or an open-circuit voltage, and, during a charging process of the traction battery, controlling the traction battery to discharge or stop being charged in response to the battery parameter changing by a parameter gap value. The parameter gap value is a first preset parameter gap value in a scenario in which the battery parameter of the traction battery is in a first parameter interval, and is a second preset parameter gap value in a scenario in which the battery parameter of the traction battery is in a second parameter interval. The first preset parameter gap value is greater than the second preset parameter gap value, and the battery parameter in the first parameter interval is less than the battery parameter in the second parameter interval.

13 Claims, 4 Drawing Sheets

(51) Int. Cl.
  *B60L 58/13*    (2019.01)
  *H01M 10/42*   (2006.01)

(56) References Cited

U.S. PATENT DOCUMENTS

2013/0076519 A1* 3/2013 Tang ................... H02J 7/34
                                                            340/636.15
2021/0146794 A1   5/2021 Ruan et al.

FOREIGN PATENT DOCUMENTS

| | | |
|---|---|---|
| CN | 110828924 A | 2/2020 |
| CN | 111532174 A | 8/2020 |
| CN | 112572233 A | 3/2021 |
| CN | 112838631 A | 5/2021 |
| JP | 2002050410 A | 2/2002 |
| JP | 2008166025 A | 7/2008 |
| JP | 2014180077 A | 9/2014 |
| WO | 2019184848 A1 | 10/2019 |

OTHER PUBLICATIONS

The China National Intellectual Property Administration (CNIPA) Notice of Grant of Patent for Invention for CN202180006382.7, dated Sep. 24, 2023 12 pages (Including English translation).
Korean Intellectual Property Office (KIPO) The Office Action for KR Application No. 10-2023-7018851 dated Oct. 26, 2023 5 Pages (Translation included ).

* cited by examiner

METHOD FOR CHARGING TRACTION BATTERY AND BATTERY MANAGEMENT SYSTEM

CROSS-REFERENCE TO RELATED APPLICATION

This application is a continuation of International Application No. PCT/CN2021/117314, filed on Sep. 8, 2021, the entire content of which is incorporated herein by reference.

TECHNICAL FIELD

The present application relates to the field of traction batteries, and in particular, to a method for charging a traction battery and a battery management system.

BACKGROUND ART

With the development of the times, electric vehicles, by virtue of their advantages such as high environmental protection performance, low noise, and low cost of use, have enormous market prospects and can effectively promote energy conservation and emission reduction, which is beneficial to the development and progress of society.

For electric vehicles and their related fields, battery technology is an important factor related to their development, especially the safety performance of batteries, which affects the development and application of battery-related products, as well as the public's acceptance of electric vehicles. Therefore, how to ensure the safety performance of batteries is an urgent technical problem to be solved.

SUMMARY

Embodiments of the present application provide a method for charging a traction battery and a battery management system, which can effectively ensure the safety performance of the traction battery.

According to a first aspect, a method for charging a traction battery is provided, which is applied to a battery management system BMS for the traction battery. The method includes: obtaining a battery parameter of the traction battery, the battery parameter comprising a state of charge SOC and/or an open-circuit voltage OCV; during a charging process of the traction battery, controlling the traction battery to discharge or stop being charged when the battery parameter of the traction battery changes by a parameter gap value, where when the battery parameter of the traction battery is in a first parameter interval, the parameter gap value is a first preset parameter gap value; and when the battery parameter of the traction battery is in a second parameter interval, the parameter gap value is a second preset parameter gap value, where the first preset parameter gap value is greater than the second preset parameter gap value, and the battery parameter in the first parameter interval is less than that in the second parameter interval.

In the above technical solution, during the process of charging the traction battery, the traction battery is made to discharge or temporarily stop being charged, which can avoid heating, lithium ion accumulation, etc. caused by continuous charging of the traction battery, and then avoid safety problems of the traction battery, such as battery fire or explosion, caused by heating, lithium ion accumulation, etc., thereby ensuring the safety performance of the traction battery.

Further, if the battery parameter (such as the SOC) of the traction battery is larger, it indicates that the negative electrode of the traction battery has a relatively low potential at the current moment, and lithium precipitation is more likely to occur. Therefore, when the battery parameter of the traction battery is relatively large, a frequency of discharging or stopping charging the traction battery is increased, that is, the parameter gap value is relatively small, which can further ensure the safety performance of the traction battery. Correspondingly, if the battery parameter (such as the SOC) of the traction battery is relatively small, it indicates that the negative electrode of the traction battery has a relatively high potential at the current moment, and compared with the case of the low negative electrode potential, the risk of lithium precipitation is lower. A frequency of discharging or stopping charging the traction battery is reduced, that is, the parameter gap value is relatively large, which can achieve the effect of suppressing lithium precipitation while reducing the impact on the charge duration of the traction battery.

In some possible implementations, the parameter gap value ranges from 3% to 95%.

In some possible implementations, the controlling the traction battery to discharge when the battery parameter of the traction battery changes by a parameter gap value includes: determining whether the battery parameter of the traction battery is equal to a target battery parameter, the target battery parameter being a battery parameter determined based on the parameter gap value; and controlling the traction battery to discharge or stop being charged if the battery parameter of the traction battery is equal to the target battery parameter.

In the above technical solution, when the battery parameter of the traction battery is equal to the target battery parameter, the BMS controls the traction battery to discharge or stop being charged. In this way, the charge and discharge of the traction battery can be better balanced, and the traction battery can be charged while ensuring the safety performance of the traction battery.

In some possible implementations, the controlling the traction battery to discharge includes: sending charging request information to a charging pile, a charging request current carried in the charging request information being 0; obtaining an actual charging current for the charging pile to charge the traction battery based on the charging request information; and controlling the traction battery to discharge when the actual charging current is less than a current threshold.

During the process of charging the traction battery, if the traction battery is directly controlled to discharge, the traction battery may be damaged, affecting the life of the traction battery; and safety hazards may be further caused, affecting the safety of the traction battery. In the above technical solution, the BMS controls the traction battery to discharge only after the BMS sends the charging request information carrying the charging request current of 0 and the actual charging current of the traction battery is relatively small, for example, less than the current threshold, which can ensure the life and performance of the traction battery, and improve the safety of the charging and discharging process of the traction battery.

In some possible implementations, the method further includes: controlling the traction battery to stop discharging when a duration of sending the charging request information to the charging pile is greater than or equal to a first time threshold.

If the BMS keeps controlling the traction battery to discharge, the normal charging process of the traction battery may be affected. In the above technical solution, when the duration of sending, by the BMS, the charging request information to the charging pile is greater than or equal to the first time threshold, the BMS controls the traction battery to stop discharging, which prevents power in the traction battery from being fully discharged, thereby ensuring normal charging of the traction battery.

In some possible implementations, the method further includes: controlling the traction battery to stop discharging when a discharge duration of the traction battery is greater than or equal to a second time threshold.

If the BMS keeps controlling the traction battery to discharge, the normal charging process of the traction battery may be affected. In the above technical solution, when the discharge duration of the traction battery is greater than or equal to the second time threshold, the BMS controls the traction battery to stop discharging, which prevents power in the traction battery from being fully discharged due to an excessively long discharge duration of the traction battery, thereby ensuring normal charging of the traction battery.

According to a second aspect, a battery management system BMS for a traction battery is provided. The BMS includes: an obtaining unit configured to obtain a battery parameter of the traction battery, the battery parameter comprising a state of charge SOC and/or an open-circuit voltage OCV; and a control unit configured to: during a charging process of the traction battery, control the traction battery to discharge or stop being charged when the battery parameter of the traction battery changes by a parameter gap value, where when the battery parameter of the traction battery is in a first parameter interval, the parameter gap value is a first preset parameter gap value; and when the battery parameter of the traction battery is in a second parameter interval, the parameter gap value is a second preset parameter gap value, where the first preset parameter gap value is greater than the second preset parameter gap value, and the battery parameter in the first parameter interval is less than that in the second parameter interval.

In some possible implementations, the parameter gap value ranges from 3% to 95%.

In some possible implementations, the control unit is specifically configured to: determine whether the battery parameter of the traction battery is equal to a target battery parameter, the target battery parameter being a battery parameter determined based on the parameter gap value; and control the traction battery to discharge or stop being charged if the battery parameter of the traction battery is equal to the target battery parameter.

In some possible implementations, the BMS further includes: a communication unit configured to send charging request information to a charging pile, a charging request current carried in the charging request information being 0; the obtaining unit is further configured to obtain an actual charging current for the charging pile to charge the traction battery based on the charging request information; and the control unit is specifically configured to control the traction battery to discharge when the actual charging current is less than a current threshold.

In some possible implementations, the control unit is further configured to: control the traction battery to stop discharging when a duration of sending the charging request information to the charging pile is greater than or equal to a first time threshold.

In some possible implementations, the control unit is further configured to: control the traction battery to stop discharging when a discharge duration of the traction battery is greater than or equal to a second time threshold.

According to a third aspect, a battery management system BMS for a traction battery is provided. The BMS includes: a memory configured to store a program; and a processor configured to execute the program stored in the memory. When the program stored in the memory is executed, the processor is configured to perform the method according to the first aspect and the implementations thereof.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without the inventive labor.

DETAILED DESCRIPTION OF EMBODIMENTS

The implementations of the present application are described in further detail below with reference to the drawings and embodiments. The detailed description of the following embodiments and the drawings are used to illustrate the principle of the present application by way of example, but should not be used to limit the scope of the present application. In other words, the present application is not limited to the described embodiments.

In the description of the present application, it should be noted that, unless otherwise specified, "a plurality of" means at least two. An orientation or position relationship indicated by the terms "upper", "lower", "left", "right", "inner", "outer", etc. is merely for convenience and simplicity of description of the present application, rather than indicating or implying that an indicated apparatus or element needs to have a particular orientation or be constructed and operated in a particular orientation, and therefore should not be construed as limiting the present application. In addition, the terms "first", "second", "third", etc. are used for descriptive purposes only, and should not be construed as indicating or implying the relative importance.

In the new energy field, a traction battery may be used as a main power source for a power consuming apparatus (such as a vehicle, a ship, or a spacecraft). At present, most of the traction batteries on the market are rechargeable batteries, among which lithium batteries, such as lithium ion batteries or lithium ion polymer batteries, are the most common. During a charging process, a traction battery is usually charged in a continuous manner. However, continuous charging of the traction battery may cause lithium precipitation, heating, etc., of the traction battery. The lithium precipitation, heating, etc., reduce performance of the traction battery, greatly shorten the cycle life, and limit a fast charging capacity of the traction battery, which may cause catastrophic consequences such as fire and explosion, causing severe safety problems.

In order to ensure the safety performance of the traction battery, the present application proposes a new method for charging a traction battery and a charging system.

Figure 1:
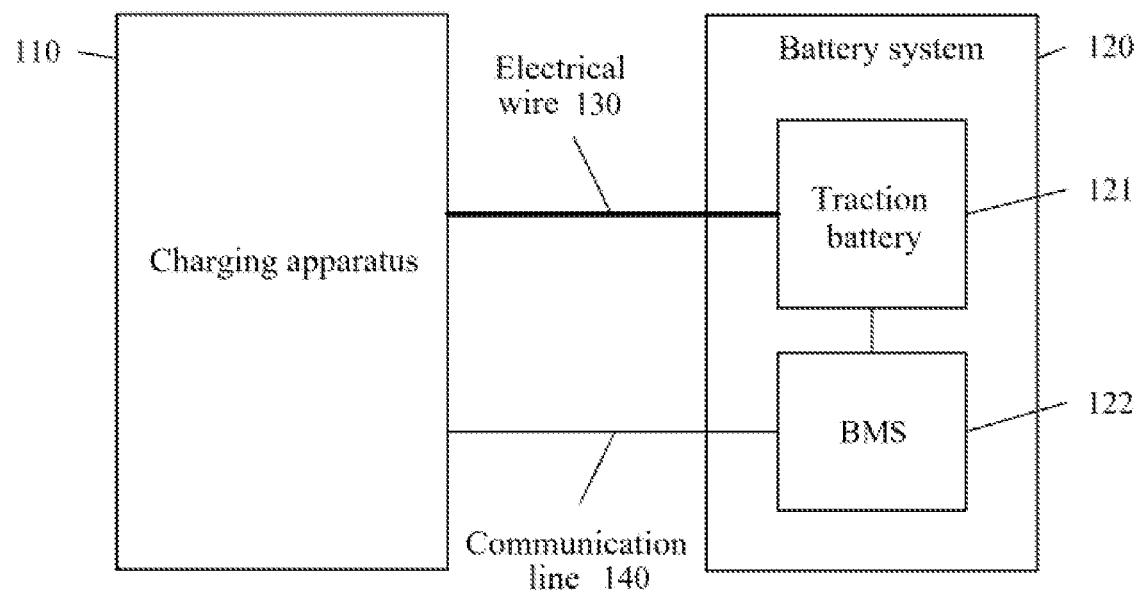
FIG. 1 is an architecture diagram of a charging system to which an embodiment of the present application is applicable.

FIG. 1 is an architecture diagram of a charging system to which an embodiment of the present application is applicable.

As shown in FIG. 1, the charging system 100 may include a charging apparatus 110 and a battery system 120. Optionally, the battery system 120 may be a battery system in an electric vehicle (including a battery electric vehicle and a plug-in hybrid electric vehicle) or a battery system in another application scenario.

Optionally, the battery system 120 may be provided with at least one battery pack, and the at least one battery pack as a whole may be referred to as a traction battery 121. In terms of battery type, the traction battery 121 may be any type of battery, which includes, but is not limited to, a lithium ion battery, a lithium metal battery, a lithium-sulfur battery, a lead-acid battery, a nickel-cadmium battery, a nickel-hydrogen battery, a lithium-air battery, or the like. In terms of battery size, the traction battery 121 in this embodiment of the present application may be a cell/battery cell, or may be a battery module or battery pack, where the battery module and battery pack each may be formed by a plurality of batteries connected in series or parallel. In this embodiment of the present application, neither of a specific type and a size of the traction battery 121 is specifically limited.

Further, for smart management and maintenance of the traction battery 121 and preventing overcharge and overdischarge of the traction battery 121 to extend the service life of the battery, the battery system 120 is usually further provided with a battery management system (BMS) 122 for implementing functions such as charge and discharge management, high voltage control, battery data acquisition, and battery status assessment. Optionally, the BMS 122 may be integrated with the traction battery 121 in a same device or apparatus, or the BMS 122 may be separate from the traction battery 121 as an independent device or apparatus.

The charging apparatus 110 may output a charging power according to a charging requirement of the BMS 122 to charge the traction battery 121. For example, the charging apparatus 110 may output a voltage and a current according to a required voltage and a required current sent by the BMS 122. Optionally, the charging apparatus 110 in this embodiment of the present application may be a charging pile, also referred to as a charging machine. The charging pile here may be, for example, a regular charging pile, a super charging pile, a vehicle-to-grid (V2G) charging pile, or the like.

As shown in FIG. 1, the charging apparatus 110 may be connected to the traction battery 121 via an electrical wire 130, and to the BMS 122 via a communication line 140, where the communication line 140 is configured to implement information exchange between the charging apparatus 110 and the BMS. As an example, the communication line 140 includes, but is not limited to, a controller area network (CAN) communication bus or a daisy chain communication bus.

In addition to communicating with the BMS 122 via the communication line 140, the charging apparatus 110 may also communicate with the BMS 122 via a wireless network. A type of wired communication or wireless communication between the charging apparatus 110 and the BMS 122 is not specifically limited in this embodiment of the present application.

Figure 2:
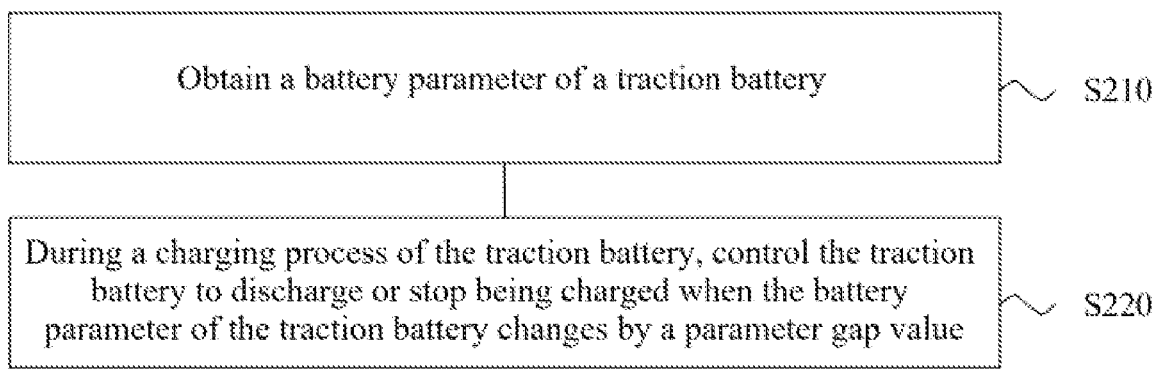
FIG. 2 is a schematic diagram of a method for charging a traction battery according to an embodiment of the present application.

FIG. 2 is a schematic diagram of a method 200 for charging a traction battery according to an embodiment of the present application. The method 200 may be performed by a BMS, which may be, e.g., the BMS 122 in FIG. 1. The method 200 may include at least part of the following content.

In step 210, a battery parameter of the traction battery is obtained, where the battery parameter may include a state of charge (SOC) and/or an open-circuit voltage (OCV).

In step 220, during a charging process of the traction battery, the traction battery is controlled to discharge or stop being charged when the battery parameter of the traction battery changes by a parameter gap value.

When the battery parameter of the traction battery is in a first parameter interval, the parameter gap value is a first preset parameter gap value; and when the battery parameter of the traction battery is in a second parameter interval, the parameter gap value is a second preset parameter gap value, where the first preset parameter gap value is greater than the second preset parameter gap value, and the battery parameter in the first parameter interval is less than the battery parameter in the second parameter interval.

In this embodiment of the present application, during the process of charging the traction battery, the traction battery is made to discharge or temporarily stop being charged, which can avoid heating, lithium ion accumulation, etc. caused by continuous charging of the traction battery, and then avoid safety problems of the traction battery, such as traction battery fire or explosion, caused by heating, lithium ion accumulation, etc., thereby ensuring the safety performance of the traction battery.

Further, if the battery parameter (such as the SOC) of the traction battery is larger, it indicates that the negative electrode of the traction battery has a relatively low potential at the current moment, and lithium precipitation is more likely to occur. Therefore, when the battery parameter of the traction battery is relatively large, a frequency of discharging or stopping charging the traction battery is increased, that is, the parameter gap value is relatively small, which can further ensure the safety performance of the traction battery. Correspondingly, if the battery parameter (such as the SOC) of the traction battery is relatively small, it indicates that the negative electrode of the traction battery has a relatively high potential at the current moment, and compared with the case of the low negative electrode potential, the risk of lithium precipitation is lower. Therefore, a frequency of discharging or stopping charging the traction battery is reduced, that is, the parameter gap value is relatively large, which can achieve the effect of suppressing lithium precipitation while reducing the impact on the charge duration of the traction battery.

The SOC, which may be used to indicate the remaining capacity of the traction battery, is numerically defined as a ratio of the current remaining capacity of the traction battery to a total available capacity and is usually expressed as a percentage. Specifically, when SOC=100%, it indicates that the traction battery is fully charged. Conversely, when SOC=0%, it indicates the traction battery is fully discharged.

The OCV refers to a potential difference between positive and negative electrodes of the traction battery when no current passes therethrough. Generally, the OCV value of the traction battery can be obtained after the traction battery is left to rest for a period of time after the end of a charge or discharge of the traction battery.

There is a correspondence between the OCV and the SOC. Therefore, in an implementation, the BMS may determine the SOC according to the OCV of the traction battery. Specifically, OCV data at different SOCs may be first measured through experiments, and a graph of a relationship between the two may be fitted, so that the BMS can estimate the SOC of the traction battery according to the measured OCV and the graph.

In another implementation, the BMS may obtain the SOC of the traction battery by using a backpropagation (BP) neural network. An input of the BP neural network may be a parameter such as current, voltage, and temperature of the traction battery, and an output thereof is the SOC of the traction battery.

In addition to the above two methods, the BMS can also obtain the SOC of the traction battery by using methods such as an ampere-hour integral method and a Kalman filter method, which are not described in detail in the embodiments of the present application.

Optionally, in this embodiment of the present application, the parameter gap value may be preset on the BMS. For example, the parameter gap value may be obtained through a large number of experiments, and then the parameter gap value is preset on the BMS at the delivery of the BMS.

Optionally, the parameter gap value may be determined by the BMS itself. For example, the BMS may determine the parameter gap value based on parameters such as the temperature and a state of health (SOH) of the traction battery, and charging conditions at the current moment.

The SOH may be used to indicate an aging status of the traction battery, and may also be understood as the remaining life of the traction battery. The performance of the traction battery decline gradually after long-term operation, and the remaining life becomes increasing short, that is, the SOH value becomes increasing small. A smaller SOH indicates a higher risk of lithium precipitation in the traction battery, and a smaller parameter gap value.

Optionally, the parameter gap value may range from 3% to 95%. For example, the parameter gap value may be 5% or 10%.

The parameter interval described above may include two intervals. For example, it is assumed that the battery parameter is the SOC. When a [0, 50%) SOC interval is the first parameter interval, an SOC gap value may be 10%. When a [50%, 100%] SOC interval is the second parameter interval, an SOC gap value may be 5%.

In addition to the first parameter interval and the second parameter interval, parameter intervals such as a third parameter interval and a fourth parameter interval may also be included in this embodiment of the present application. For example, a [0, 40%) SOC interval is the first parameter interval, a [40%, 80%) SOC interval is the second parameter interval, and an [80%, 100%] SOC interval is the third parameter interval, where an SOC gap value for the [0, 40%) SOC interval>an SOC gap value for the [40%, 80%) SOC interval>an SOC gap value for the [80%, 100%] SOC interval.

As the parameter is divided in to more intervals, the effect of suppressing lithium precipitation becomes better, that is, the safety of the traction battery becomes better. In addition, this can further reduce the impact on the charge duration and thereby improve user experience.

Optionally, in this embodiment of the present application, controlling, by the BMS, the traction battery to discharge may be specifically: controlling, by the BMS based on a discharge parameter, the traction battery to discharge.

The discharge parameter may include, but is not limited to, a discharge duration, a discharge current, a discharge voltage, and the like. The discharge duration may be, for example, 1 s to 60 s, and the current may be, for example, 1 A to 5 A.

In a possible implementation, the BMS may determine the discharge parameter based on at least one of the following parameters: the temperature of the traction battery, the SOH of the traction battery, the SOC of the traction battery, external conditions of the traction battery at the current moment, etc.

The BMS may obtain the temperature and/or the SOH of the traction battery before charging, or may obtain the temperature and/or the SOH of the traction battery during the charging process.

It should be understood that, the term "and/or" herein is a mere indication of an association relationship describing associated objects, and indicates that three relationships may exist. For example, A and/or B may indicate the following three cases: only A exists, both A and B exist, and only B exists.

As an example, if the temperature of the traction battery is relatively low, e.g., −10° C., the discharge duration may be relatively short, e.g., 10s; and if the temperature of the traction battery is normal, e.g., 20° C., the discharge duration may be relatively long, e.g., 40s.

As an example, if the SOH of the traction battery is larger, the discharge duration may be longer, and the discharge current may be larger.

In the above technical solution, the BMS comprehensively determines the discharge parameter of the traction battery based on the plurality of parameters. In this way, the determined discharge parameter is more accurate, so that the traction battery can be better discharged.

Optionally, in this embodiment of the present application, step 220 may be specifically: controlling, by the BMS, the traction battery to discharge or stop being charged each time the battery parameter of the traction battery changes by the parameter gap value.

As an example, the BMS may control the traction battery to discharge once each time the battery parameter of the traction battery changes by the parameter gap value.

It is assumed that the battery parameter is the OCV. When a [0, 50%) OCV interval is the first parameter interval, an OCV gap value is 10%. When a [50%, 100%] OCV interval is the second parameter interval, an OCV gap value is 5%. When the OCV of the traction battery is 10% OCV, the BMS controls the traction battery to discharge once; then, when the OCV of the traction battery is 20% OCV, the BMS controls the traction battery to discharge once again; and then, when the OCV of the traction battery is 30% OCV, 40% OCV, 50% OCV, 55% OCV, 60% OCV, 65% OCV, 70% OCV, 75% OCV, 80% OCV, 85% OCV, 90% OCV, 95% OCV, and 100% OCV, the BMS may respectively control the traction battery to discharge once.

As another example, the BMS may control the traction battery to discharge multiple times each time the battery parameter of the traction battery changes by the parameter gap value.

For example, it is still assumed that the battery parameter is the OCV. When a [0, 50%) OCV interval is the first parameter interval, an OCV gap value is 10%. When a [50%, 100%] OCV interval is the second parameter interval, an OCV gap value is 5%. When the OCV of the traction battery is 10% OCV, the BMS controls the traction battery to discharge twice, where a time gap between the two discharges may be less than a specific time threshold.

Optionally, the discharge parameter of each discharge of the traction battery may be the same. For example, the discharge duration and the discharge current of each discharge of the traction battery are 20 s and 10 A, respectively.

Alternatively, the discharge parameter of each discharge of the traction battery may be different. For example, when the SOC of the traction battery is 10% SOC, the traction battery discharges for 50 s at a discharge current of 3 A; and when the SOC of the traction battery is 55% SOC, the traction battery discharges for 30 s at a discharge current of 1 A.

Optionally, in this embodiment of the present application, step 220 may specifically include: determining whether the battery parameter of the traction battery is equal to a target battery parameter; and controlling, by the BMS, the traction battery to discharge or stop being charged if the battery parameter of the traction battery is equal to the target battery parameter.

The target battery parameter is a battery parameter determined based on the parameter gap value. For example, if the parameter gap value is 5%, the target battery parameter is 5%, 10%, 15%, 20%, . . . .

The target battery parameter may be preset on the BMS. For example, as shown in Table 1 and Table 2, the target battery parameter may be preset on the BMS in the form of a table.

TABLE 1

| Parameter interval | First parameter interval | | | | |
|---|---|---|---|---|---|
| Target battery parameter | 10% | 20% | 30% | 40% | 50% |

TABLE 2

| Parameter interval | Second parameter interval | | | | | | | | | |
|---|---|---|---|---|---|---|---|---|---|---|
| Target battery parameter | 55% | 60% | 65% | 70% | 75% | 80% | 85% | 90% | 95% | 100% |

It should be understood that the specific examples herein are only intended to help those skilled in the art better understand the embodiments of the present application, rather than limiting the scope of the embodiments of the present application.

In the above technical solution, when the battery parameter of the traction battery is equal to the target battery parameter, the BMS controls the traction battery to discharge or stop being charged. In this way, the charge and discharge of the traction battery can be better balanced, and the traction battery can be charged while ensuring the safety performance of the traction battery.

When the battery parameter of the traction battery changes by the parameter gap value, the method 200 may further include: sending, by the BMS, charging request information to a charging pile, a charging request current carried in the charging request information being 0. In other words, the charging request information is used to indicate the charging pile to stop charging the traction battery.

Figure 3:
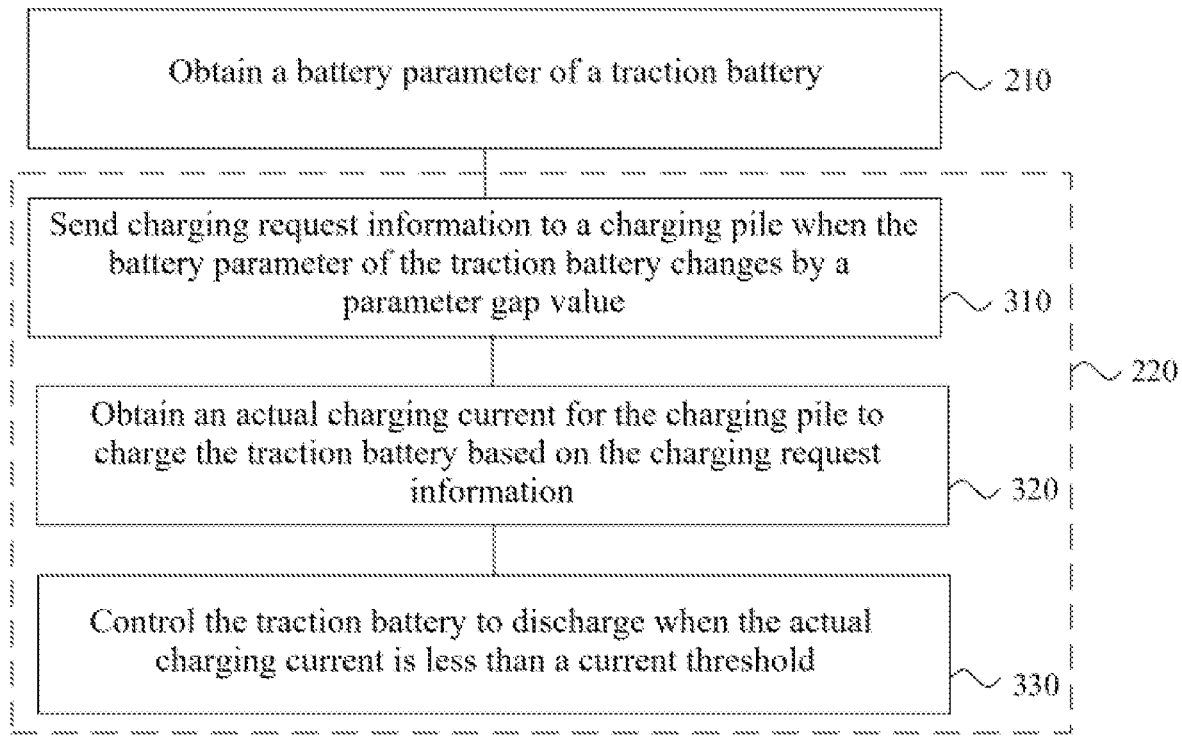
FIG. 3 is a schematic diagram of another method for charging a traction battery according to an embodiment of the present application.

FIG. 3 is a schematic flowchart of a possible implementation of step 220 in FIG. 2. The method of FIG. 3 may include steps 310 to 330.

In step 310, the BMS sends the charging request information to the charging pile when the battery parameter of the traction battery changes by the parameter gap value, the charging request current carried in the charging request information being 0.

In step 320, the BMS obtains an actual charging current for the charging pile to charge the traction battery based on the charging request information.

In step 330, the traction battery is controlled to discharge when the actual charging current is less than a current threshold.

Under normal circumstances, after the charging pile receives the charging request information carrying the charging request current of 0 and sent by the BMS, the actual charging current transmitted from the charging pile to the traction battery gradually drops, and does not drop to 0 immediately. The BMS controls the traction battery to discharge only when the actual charging current drops below the current threshold.

The current threshold is not specifically limited in this embodiment of the present application. As an example, the current threshold may be 50 A.

During the process of charging the traction battery, if the traction battery is directly controlled to discharge, the traction battery may be damaged, affecting the life of the traction battery; and safety hazards may be further caused, affecting the safety of the traction battery. In the above technical solution, the BMS controls the traction battery to discharge only after the BMS sends the charging request information carrying the charging request current of 0 and the actual charging current of the traction battery is relatively small, for example, less than the current threshold, which can ensure the life and performance of the traction battery, and improve the safety of the charging and discharging process of the traction battery.

In order to ensure the normal charging of the traction battery, further, the method 200 may further include: controlling, by the BMS, the traction battery to stop discharging.

As an example, the BMS may control the traction battery to stop discharging when a duration of sending, by the BMS, the charging request information to the charging pile is greater than or equal to a first time threshold.

The duration of sending, by the BMS, the charging request information to the charging pile may be understood as a total duration of sending, by the BMS, a plurality of pieces of charging request information to the charging pile. For example, the BMS sends the charging request information to the charging pile every 5 s; and if the BMS sends the charging request information six times in total, the duration of sending, by the BMS, the charging request information to the charging pile is 30 s.

Optionally, when the BMS sends the charging request information to the charging pile for the first time, the BMS may start a first timer, where a timing duration of the first timer is the first time threshold. After the first timer expires, the BMS may control the traction battery to stop discharging.

Optionally, the first time threshold may be, but is not limited to, 60 s.

As another example, when the discharge duration of the traction battery is greater than or equal to a second time threshold, the BMS may control the traction battery to stop discharging.

Optionally, the second time threshold may be, but is not limited to, 20 s.

Optionally, when the traction battery starts to discharge, the BMS may start a second timer, where a timing duration of the second timer is the second time threshold. After the second timer expires, the BMS may control the traction battery to stop discharging.

As still another example, when a discharged capacity of the traction battery reaches a specific value, the BMS may control the traction battery to stop discharging.

If the BMS keeps controlling the traction battery to discharge, the normal charging process of the traction battery may be affected. In the above technical solution, when the duration of sending, by the BMS, the charging request information to the charging pile is greater than or equal to the first time threshold, or when the discharge duration of the traction battery is greater than or equal to the second time threshold, the BMS controls the traction battery to stop discharging, which prevents power in the traction battery from being fully discharged, thereby ensuring normal charging of the traction battery.

After the BMS controls the traction battery to stop discharging, the BMS may send a charging requirement parameter to the charging pile. The charging requirement parameter may be used to indicate the charging pile to output a charging current, which is used to charge the traction battery. After receiving the charging requirement parameter, the charging pile outputs the charging current to the traction battery based on the charging requirement parameter.

The BMS may determine the charging requirement parameter based on at least one of the following parameters of the traction battery: the temperature of the traction battery, a voltage of the traction battery, a capacity of the traction battery, and the SOC of the traction battery.

In the above technical solution, after the traction battery stops discharging, the BMS sends the charging requirement parameter to the charging pile, so that the charging pile continues to charge the traction battery, thereby achieving the purpose of charging the traction battery.

Optionally, in this embodiment of the present application, the method 200 may further include: determining, by the BMS, a status of the traction battery, and controlling the traction battery to discharge when the traction battery is in a fully charged state or a gun-removed state.

For example, the BMS may obtain a parameter of the traction battery, and determine the status of the traction battery based on the parameter of the traction battery. For example, the parameter of the traction battery may include the SOC, and when the SOC of the traction battery reaches 100%, the BMS may determine that the traction battery is in a fully charged state.

For another example, the BMS may send confirmation information to the charging pile, and if the BMS does not receive response information sent by the charging pile for the confirmation information, the BMS may determine that the traction battery is in a gun-removed state.

A discharge parameter used by the BMS to control the traction battery to discharge when the traction battery is in the fully charged state or the gun-removed state may be the same as that used when the traction battery is in a charging state. For example, regardless of the charging state, the fully charged state, or the gun-removed state, the discharge current and the discharge duration of the traction battery may be 10 A and 20 s, respectively.

Alternatively, the discharge parameter used by the BMS to control the traction battery to discharge when the traction battery is in the fully charged state or the gun-removed state may be different from that used when the traction battery is in the charging state. For example, the discharge duration may be less than that used when the traction battery is in the charging state, and the discharge current may be less than that used when the traction battery is in the charging state.

In the above technical solution, when the traction battery is in the fully charged state or the gun-removed state, the BMS controls the traction battery to discharge, which can prevent the charging pile from directly charging the traction battery after the charging pile is connected to the traction battery during the subsequent charging process of the traction battery, thereby avoiding the risk of lithium precipitation of the traction battery, and further improving the safety performance of the traction battery.

During the discharge of the traction battery, a discharge object of the traction battery may be the charging pile. After receiving electricity discharged from the traction battery, the charging pile may use the received electricity to charge another vehicle.

Alternatively, the discharge object of the traction battery may be a vehicle on which the traction battery is located, which may be specifically, for example, an air conditioner on the vehicle.

Alternatively, the discharge object of the traction battery may be another external device, such as a power bank.

In this way, the recycling of electricity can be realized, and the purpose of energy conservation can be achieved.

It should be noted that after the gun is removed from the vehicle, the discharge target of the traction battery does not include the charging pile.

Figure 4:
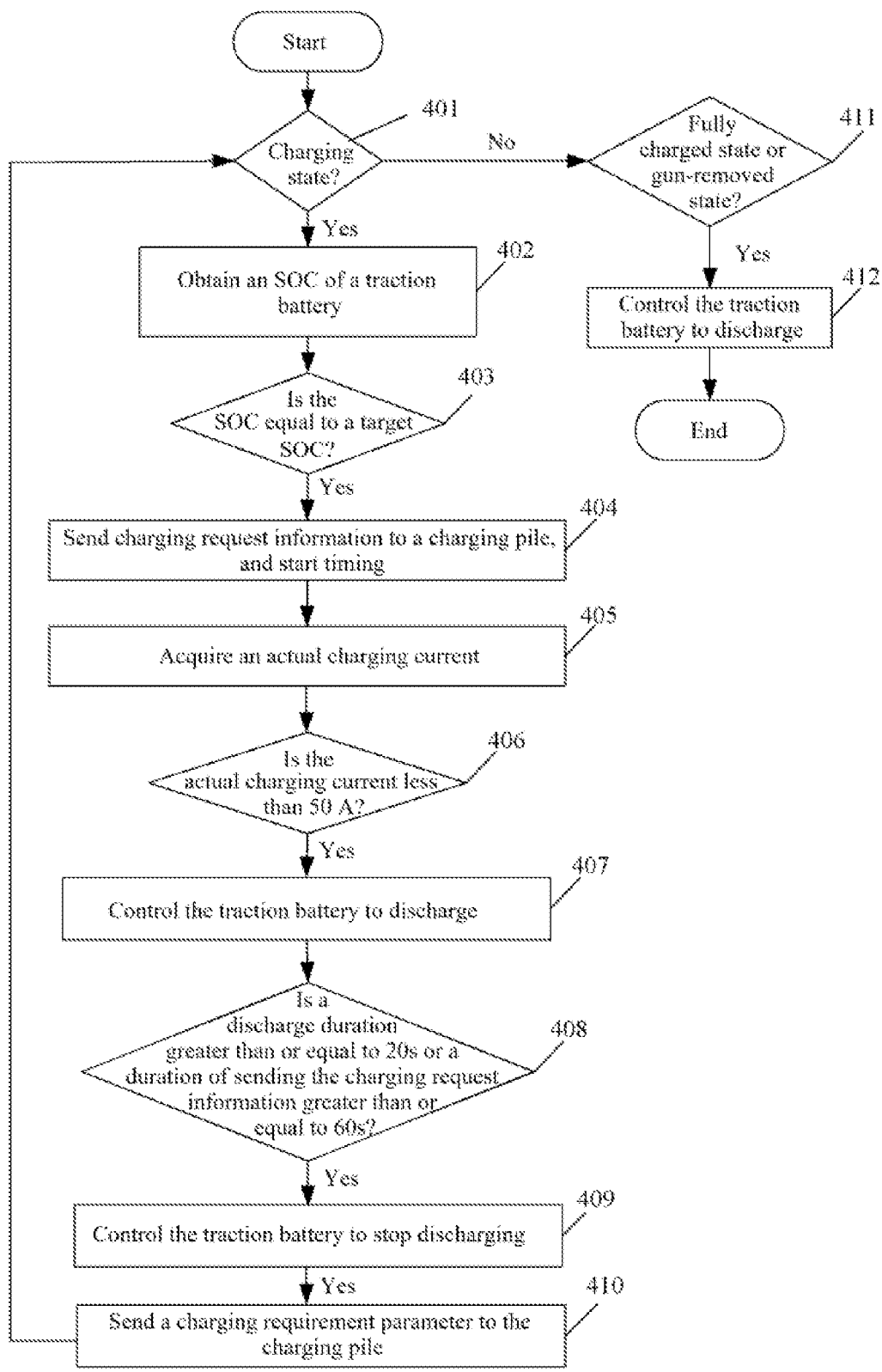
FIG. 4 is a schematic flowchart of a method for charging a traction battery according to an embodiment of the present application.

In order to more clearly understand the method 200 for charging a traction battery in this embodiment of the present application, a method for charging a traction battery in a possible embodiment of the present application is described below with reference to FIG. 4. In FIG. 4, a battery parameter is an SOC, a current threshold is 50 A, a first time threshold is 60 s, and a second time threshold is 20 s.

In step 401, a BMS determines whether the traction battery is in a charging state.

If the traction battery is in the charging state, perform step 402; and if the traction battery is not in the charging state, perform step 411.

In step 402, the BMS obtains an SOC of the traction battery.

In step 403, the BMS determines whether the SOC of the traction battery is equal to a target SOC.

In step 404, if the SOC of the traction battery is equal to the target SOC, the BMS sends charging request information to a charging pile and starts timing.

A charging request current carried in the charging request information is 0.

In step 405, the BMS acquires an actual charging current for the charging pile to charge the traction battery.

In step 406, the BMS determines whether the actual charging current is less than 50 A.

If the actual charging current is less than 50 A, perform step 407.

In step 407, the BMS controls the traction battery to discharge.

For example, the BMS may control the traction battery to discharge for a discharge duration of 20 s at a current of 10 A.

In step 408, the BMS determines whether a duration of sending, by the BMS, the charging request information to the charging pile is greater than or equal to 60 s, or determines whether a discharge duration of the traction battery is greater than or equal to 20 s.

If the duration of sending, by the BMS, the charging request information to the charging pile is greater than or equal to 60 s, or the discharge duration of the traction battery is greater than or equal to 20 s, perform step 409.

In step 409, the BMS controls the traction battery to stop discharging.

In step 410, the BMS sends a charging requirement parameter to the charging pile.

The charging requirement parameter is used to indicate the charging pile to output a charging current, which is used to charge the traction battery.

In step 411, the BMS determines whether the traction battery is in a fully charged state or a gun-removed state.

In step 412, if the traction battery is in the fully charged state or the gun-removed state, the BMS controls the traction battery to discharge.

For example, the BMS may control the traction battery to discharge at a current of 10 A for 20 s.

The method embodiments of the embodiments of the present application are described in detail above, and the apparatus embodiments of the embodiments of the present application are described below. The apparatus embodiments correspond to the method embodiments. Therefore, for the parts that are not described in detail, refer to the foregoing method embodiments. The apparatus may implement any possible implementation in the above methods.

Figure 5:
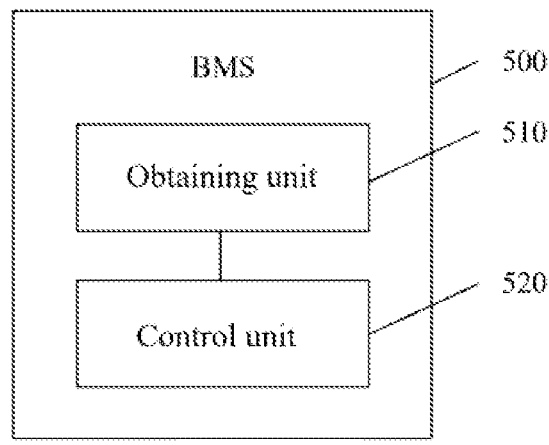
FIG. 5 is a schematic block diagram of a BMS according to an embodiment of the present application.

FIG. 5 is a schematic block diagram of a BMS 500 according to an embodiment of the present application. The BMS 500 may perform the foregoing method 200 for charging a traction battery in the embodiment of the present application. As shown in FIG. 5, the BMS 500 may include an obtaining unit 510 and a control unit 520.

The obtaining unit 510 is configured to obtain a battery parameter of the traction battery, the battery parameter including a state of charge SOC and/or an open-circuit voltage OCV.

The control unit 520 is configured to: during a charging process of the traction battery, control the traction battery to discharge or stop being charged when the battery parameter of the traction battery changes by a parameter gap value.

When the battery parameter of the traction battery is in a first parameter interval, the parameter gap value is a first preset parameter gap value; and when the battery parameter of the traction battery is in a second parameter interval, the parameter gap value is a second preset parameter gap value, where the first preset parameter gap value is greater than the second preset parameter gap value, and the battery parameter in the first parameter interval is less than that in the second parameter interval.

Optionally, in an embodiment of the present application, the parameter gap value ranges from 3% to 95%.

Optionally, in an embodiment of the present application, the control unit 520 is specifically configured to: determine whether the battery parameter of the traction battery is equal to a target battery parameter, the target battery parameter being a battery parameter determined based on the parameter gap value; and control the traction battery to discharge or stop being charged if the battery parameter of the traction battery is equal to the target battery parameter.

Optionally, in an embodiment of the present application, the BMS 500 further includes: a communication unit configured to send charging request information to a charging pile, a charging request current carried in the charging request information being 0. The obtaining unit 510 is further configured to obtain an actual charging current for the charging pile to charge the traction battery based on the charging request information. The control unit 520 is specifically configured to control the traction battery to discharge when the actual charging current is less than a current threshold.

Optionally, in an embodiment of the present application, the control unit 520 is further configured to: control the traction battery to stop discharging when a duration of sending the charging request information to the charging pile is greater than or equal to a first time threshold.

Optionally, in an embodiment of the present application, the control unit 520 is further configured to: control the traction battery to stop discharging when a discharge duration of the traction battery is greater than or equal to a second time threshold.

It should be understood that the BMS 500 may implement the corresponding operations of the BMS in the method 200, and for the sake of brevity, details are not repeated here.

Figure 6:
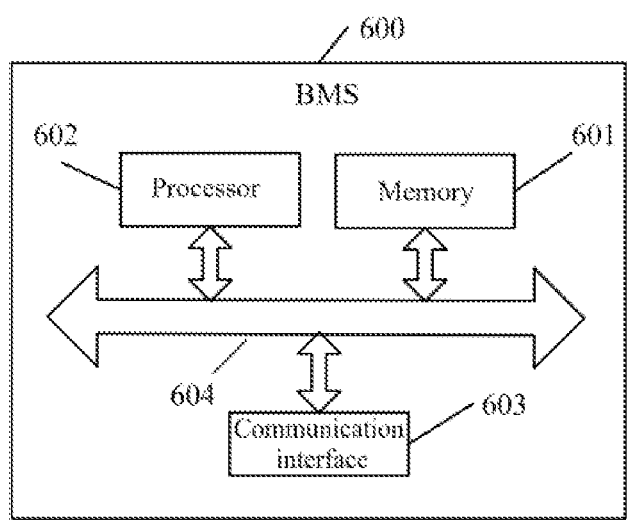
FIG. 6 is a schematic block diagram of a BMS according to an embodiment of the present application.

FIG. 6 is a schematic diagram of a hardware structure of a BMS according to an embodiment of the present application. The BMS 600 includes a memory 601, a processor 602, a communication interface 603, and a bus 604. The memory 601, the processor 602, and the communication interface 603 are communicatively connected to each other through the bus 604.

The memory 601 may be a read-only memory (ROM), a static storage device, and a random access memory (RAM). The memory 601 may store a program, and when the program stored in the memory 601 is executed by the processor 602, the processor 602 and the communication interface 603 are configured to perform the steps of the method for charging a traction battery in the embodiments of the present application.

The processor 602 may be a general-purpose central processing unit (CPU), a microprocessor, an application-specific integrated circuit (ASIC), a graphics processing unit (GPU), or one or more integrated circuits, to execute related programs to implement functions required to be performed by units in the apparatus in the embodiments of the present application, or perform the method for charging a traction battery in the embodiments of the present application.

The processor 602 may also be an integrated circuit chip having a signal processing capability. In an implementation process, the steps of the method for charging a traction battery in the embodiments of the present application may be implemented by using a hardware integrated logic circuit in the processor 602, or by using instructions in the form of software.

The processor 602 may also be a general-purpose processor, a digital signal processor (DSP), an ASIC, a field-programmable gate array (FPGA) or another programmable logic device, a discrete gate or transistor logic device, or a discrete hardware component. Various methods, steps, and logical block diagrams disclosed in the embodiments of the present application may be implemented or executed. The general-purpose processor may be a microprocessor, or the processor may be any conventional processor, etc. The steps of the methods disclosed with reference to the embodiments of the present application may be directly presented as being performed and completed by a hardware processor, or performed and completed by a combination of hardware and a software module in a processor. The software module may be located in a mature storage medium in the art, such as a random access memory, a flash memory, a read-only memory, a programmable read-only memory, an electrically erasable programmable memory, or a register. The storage medium is located in the memory 601, and the processor 602 reads the information in the memory 601, and completes, in combination with its hardware, functions required to be performed by units included in the BMS in the embodiments of the present application, or perform the method for charging a traction battery in the embodiments of the present application.

The communication interface 603 uses a transceiver apparatus such as, but not limited to, a transceiver to implement communication between the BMS 600 and other devices or communication networks. For example, the BMS 600 may send charging request information to a charging pile through the communication interface 603.

The bus 604 may include a path for transferring information between various components (for example, the memory 601, the processor 602, and the communication interface 603) of the BMS 600.

It should be noted that although the BMS 600 described above show only a memory, a processor, and a communication interface, in a specific implementation process, persons skilled in the art should understand that the BMS 600 may further include other components needed for normal operation. In addition, according to specific requirements, those skilled in the art should understand that the BMS 600 may further include hardware devices for implementing other additional functions. In addition, those skilled in the art should understand that the BMS 600 may include only components needed to implement the embodiment of the present application, and does not necessarily include all the components shown in FIG. 6.

An embodiment of the present application further provides a computer-readable storage medium, which stores program code executable by a device, and the program code includes instructions for performing the steps in the foregoing method for charging a traction battery.

An embodiment of the present application further provides a computer program product. The computer program product includes a computer program stored on a computer-readable storage medium. The computer program includes program instructions that, when executed by a computer, cause the computer to perform the foregoing method for charging a traction battery.

The foregoing computer-readable storage medium may be a transitory computer-readable storage medium or a non-transitory computer-readable storage medium.

It should be understood that, in the embodiments of the present application, sequence numbers of the foregoing processes do not mean execution sequences. The execution sequences of the processes should be determined according to functions and internal logic of the processes, and should not be construed as any limitation on the implementation processes of the embodiments of the present application.

It should also be understood that the various implementations described in this specification may be implemented separately or in combination, which is not limited in the embodiments of the present application.

While the present application has been described with reference to some embodiments, various modifications can be made, and equivalents can be provided to substitute for the components thereof without departing from the scope of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. A method for charging a traction battery, which is applied to a battery management system (BMS) for the traction battery, the method comprising:
    obtaining a battery parameter of the traction battery, the battery parameter comprising at least one of a state of charge (SOC) or an open-circuit voltage (OCV); and
    during a charging process of the traction battery, controlling the traction battery to discharge or stop being charged in response to the battery parameter of the traction battery changing by a parameter gap value;
    wherein the parameter gap value is a first preset parameter gap value in a scenario in which the battery parameter of the traction battery is in a first parameter interval, and is a second preset parameter gap value in a scenario in which the battery parameter of the traction battery is in a second parameter interval, wherein the first preset parameter gap value is greater than the second preset parameter gap value, and the battery parameter in the first parameter interval is less than the battery parameter in the second parameter interval.

2. The method according to claim 1, wherein the parameter gap value ranges from 3% to 95%.

3. The method according to claim 1, wherein controlling the traction battery to discharge or stop being charged in response to the battery parameter of the traction battery changing by the parameter gap value comprises:
    determining whether the battery parameter of the traction battery is equal to a target battery parameter, the target battery parameter being a battery parameter determined based on the parameter gap value; and
    controlling the traction battery to discharge or stop being charged in response to the battery parameter of the traction battery being equal to the target battery parameter.

4. The method according to claim 1, wherein controlling the traction battery to discharge comprises:
    sending charging request information to a charging pile, a charging request current carried in the charging request information being 0;
    obtaining an actual charging current for the charging pile to charge the traction battery based on the charging request information; and
    controlling the traction battery to discharge in response to the actual charging current being less than a current threshold.

5. The method according to claim 4, further comprising:
    controlling the traction battery to stop discharging in response to a duration of sending the charging request information to the charging pile being greater than or equal to a time threshold.

6. The method according to claim 1, further comprising:
    controlling the traction battery to stop discharging in response to a discharge duration of the traction battery being greater than or equal to a time threshold.

7. A battery management system (BMS) for a traction battery, the BMS comprising:
    an obtaining unit configured to obtain a battery parameter of the traction battery, the battery parameter comprising at least one of a state of charge (SOC) or an open-circuit voltage OCV; and
    a control unit configured to: during a charging process of the traction battery, control the traction battery to discharge or stop being charged in response to the battery parameter of the traction battery changing by a parameter gap value;

wherein the parameter gap value is a first preset parameter gap value in a scenario in which the battery parameter of the traction battery is in a first parameter interval, and is a second preset parameter gap value in a scenario in which the battery parameter of the traction battery is in a second parameter interval, wherein the first preset parameter gap value is greater than the second preset parameter gap value, and the battery parameter in the first parameter interval is less than the battery parameter in the second parameter interval.

8. The BMS according to claim 7, wherein the parameter gap value ranges from 3% to 95%.

9. The BMS according to claim 7, wherein the control unit is further configured to:

determine whether the battery parameter of the traction battery is equal to a target battery parameter, the target battery parameter being a battery parameter determined based on the parameter gap value; and control the traction battery to discharge or stop being charged in response to the battery parameter of the traction battery being equal to the target battery parameter.

10. The BMS according to claim 7, further comprising:

a communication unit configured to send charging request information to a charging pile, a charging request current carried in the charging request information being 0;

wherein:
the obtaining unit is further configured to obtain an actual charging current for the charging pile to charge the traction battery based on the charging request information; and the control unit is further configured to control the traction battery to discharge in response to the actual charging current being less than a current threshold.

11. The BMS according to claim 10, wherein the control unit is further configured to:

control the traction battery to stop discharging in response to a duration of sending the charging request information to the charging pile being greater than or equal to a time threshold.

12. The BMS according to claim 7, wherein the control unit is further configured to:

control the traction battery to stop discharging in response to a discharge duration of the traction battery being greater than or equal to a time threshold.

13. A battery management system (BMS) for a traction battery, comprising:

a processor; and a memory storing a computer program that, when executed by the processor, causes the processor to:

obtain a battery parameter of the traction battery, the battery parameter comprising at least one of a state of charge (SOC) or an open-circuit voltage (OCV); and during a charging process of the traction battery, control the traction battery to discharge or stop being charged in response to the battery parameter of the traction battery changing by a parameter gap value;

wherein the parameter gap value is a first preset parameter gap value in a scenario in which the battery parameter of the traction battery is in a first parameter interval, and is a second preset parameter gap value in a scenario in which the battery parameter of the traction battery is in a second parameter interval, wherein the first preset parameter gap value is greater than the second preset parameter gap value, and the battery parameter in the first parameter interval is less than the battery parameter in the second parameter interval.

* * * * *